(No Model.)
F. A. MERSHON.
NUT LOCK.
No. 545,516. Patented Sept. 3, 1895.
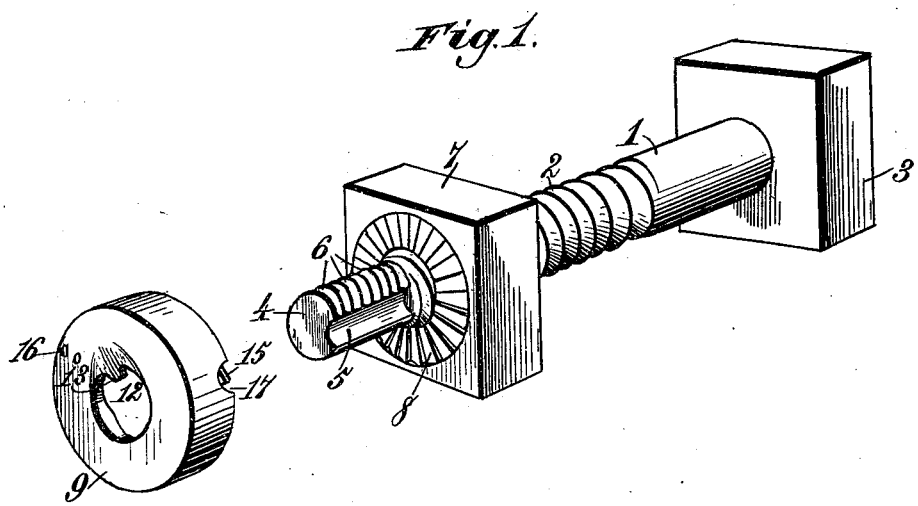
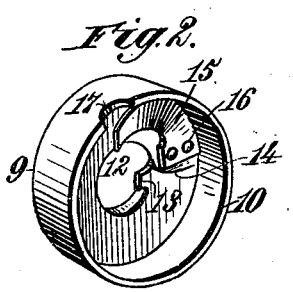
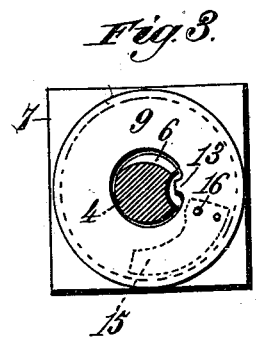
Witnesses.
Robert Everitt,
Thos. A. Green
Inventor:
Frank A. Mershon.
By James L. Norris,
Atty.

UNITED STATES PATENT OFFICE.

FRANK A. MERSHON, OF SPARROW'S POINT, ASSIGNOR OF ONE-HALF TO RUFUS W. APPLEGARTH, OF BALTIMORE, MARYLAND.

NUT-LOCK.

SPECIFICATION forming part of Letters Patent No. 545,516, dated September 3, 1895.

Application filed February 16, 1895. Serial No. 538,680. (No model.)

*To all whom it may concern:*

Be it known that I, FRANK A. MERSHON, a citizen of the United States, residing at Sparrow's Point, in the county of Baltimore and State of Maryland, have invented new and useful Improvements in Nut-Locks, of which the following is a specification.

This invention has for its object to provide new and improved means for locking screw-nuts on bolts designed for fastening the fish-plates of railway-rails, or for connecting or securing together different parts or objects of any kind, or for any and all of the various purposes for which bolts are ordinarily employed.

To accomplish this object my invention consists in the combination of a threaded and longitudinally-grooved bolt having a channeled or furrowed portion which trends diagonally or spirally in a direction around the axis of the bolt the reverse of the direction in which the screw-thread of the bolt trends, with a nut having a toothed or ratchet face and a nut-locking cup or block provided with an elastic pawl or tongue and a bolt-hole, the edge of which is constructed with a lip or lug adapted to traverse the groove in the bolt and enter one of the diagonal or spiral channels or furrows.

The invention also consists in certain details of construction and combination or arrangement of parts, hereinafter described and claimed, reference being made to the accompanying drawings, in which—

Figure 1 is a perspective view of a bolt constructed in accordance with my invention and having the nut arranged thereupon, the nut-locking cup or block being detached from the bolt preparatory to applying the same thereto. Fig. 2 is a detail perspective view looking at the inside of the nut-locking cup or block, and Fig. 3 is an end elevation with the grooved extremity of the bolt in section and showing the lip of the cup or block preparatory to entering into engagement with the diagonally or spirally channeled or furrowed portion of the bolt.

In order to enable those skilled in the art to make and use my invention, I will now describe the same in detail, referring to the drawings, wherein—

The numeral 1 indicates a bolt having a screw-thread 2 and a rigid head 3, which, as here shown, is square in configuration, but which may be of any desired form or shape. The screw-thread 2 of the bolt terminates at some distance from the extremity of the bolt which lies opposite the head 3 thereof, and this end portion, which is indicated by the numeral 4, is somewhat reduced in diameter, and for the greater part of its circumference is plain or smooth. The reduced end is formed with a longitudinal groove 5, running from the extreme outer end portion thereof to or near the outer beginning of the screw-thread 2. The reduced end is also constructed with a channeled or furrowed portion which trends diagonally or spirally in a direction around the axis of the bolt, for the purpose of producing a plurality of channels or furrows 6. With the exception of the channeled or furrowed part of the reduced end portion 4, the latter is plain or smooth, as before stated. The diagonal or spiral channels or furrows 6 extend in a direction the reverse or opposed to the direction in which the screw-thread 2 of the bolt trends. If the screw-thread 2 is a right-hand screw-thread, the channels or furrows will run to the left or be left-handed. The channels or furrows 6 all communicate at one end portion thereof with the longitudinal groove 5, for a purpose hereinafter explained.

The nut 7 may be square, hexagonal, octagonal, or any other form or shape, and its outer side is constructed with an annular, toothed, or ratchet face 8, concentric with the screw-threaded orifice through the nut.

The nut-locking cup or hollow block 9 is preferably, but not necessarily, circular in form or shape, and comprises a disk portion, from which extends an annular flange or rim 10 of a greater diameter than the diameter of the toothed or ratchet face 8. The center of the disk part of the cup or block is formed with a bolt-hole 12, having its edge provided with a lip or lug 13, projecting toward the center of the bolt-hole, and of such dimensions that it can readily traverse the longitudinal groove 5 and enter into engagement with any one of the channels or furrows 6 when the cup or block is turned in the proper direction.

The disk part of the cup or block is provided on its inner side with a projecting body of metal, sufficient to constitute an abutment or shoulder 14, against which bears or lies the attached extremity of an elastic pawl or tongue 15. The pawl or tongue is rigidly secured to the disk portion of the cup or block through the medium of rivets 16, or otherwise.

The outer free extremity or unattached end of the pawl or tongue normally projects beyond the edge of the flange or rim 10, so that when the cup or block is placed upon the reduced end portion 4, and pressed up closely or tightly against the nut 7, the pawl or tongue will yield inwardly and act upon the annular, toothed, or ratchet face 8, similar to a spring-pawl. In placing the cup or block upon the reduced end portion of the bolt, the lip or lug 13 is registered with the groove 5, and traverses the same as the cup or block is moved toward and against the nut 7. When the elastic pawl or tongue is in proper operative connection with the annular, toothed, or ratchet face 8, the cup or block is turned to the left, and the lip or lug 13 enters one of the diagonal or spiral channels or furrows 6, while the elastic pawl or tongue snaps past and interlocks with the toothed or ratchet portion of the nut. It being assumed that the nut 7 has been screwed up tightly against the object to be secured, the nut cannot turn farther to the right, while it cannot turn to the left by reason of the interlocking of the pawl or tongue 15 with the toothed or ratchet face 8, and the engagement of the lip or lug 13 with one of the left-hand channels or furrows 6. The pawl or tongue engaging the toothed or ratchet face of the nut effectually prevents the nut from turning to the left, and the lip or lug 13, engaging one of the diagonal or spiral channels or furrows 6, prevents the possibility of the cup or block turning to the left, because of the obstruction offered by the sides of the left-hand channel or furrow 6 in which the lip or lug is arranged. By the means described the nut is effectually locked against the possibility of movement in the direction necessary to loosen or unscrew it, and a very simple, efficient, and desirable nut-lock is provided. The bolt described and shown is the same as any ordinary bolt, with the exception of the reduced end portion 4, with its groove 5 and diagonal or spiral channels or furrows.

The reduced end portion 4 may be of any diameter suitable for the conditions required, but preferably it is about one-half inch in diameter and about five-eighths to three-quarters of an inch long in a bolt five-eighths of an inch in diameter. The dimensions stated, however, are simply given as an example, and I do not wish to be understood as confining myself to any particular size, either of the bolt or the reduced end portion thereof.

The rim 10 of the nut-locking cup or block 9 is provided in its edge with a notch or recess 17, which renders it possible to insert some suitable instrument for the purpose of withdrawing the elastic pawl or tongue 15 from engagement with the toothed or ratchet face of the nut, whereupon the nut-locking cup or block can be turned to the right to place the lip or lug 13 in the groove 5 and thus render it possible to remove the nut from the bolt whenever occasion demands. The rim 10 of the nut-locking cup or block is of such diameter that when the latter is in operative connection with the nut the rim 10 entirely incloses and covers and conceals the annular, toothed, or ratchet face of the nut. The nut-locking cup or block is preferably made of cast malleable iron, but any metal suitable for the purpose can be employed. The depth of the cup may be varied more or less to increase or diminish the extent to which the elastic pawl or tongue must yield when the edge of the flange or rim 10 is forced against the nut.

Having thus described my invention, what I claim is—

1. The combination of a threaded and longitudinally grooved bolt having a channeled or furrowed portion trending diagonally or spirally in a direction opposed to the direction of the screw-thread of the bolt, and communicating with the longitudinal groove, with a nut having a toothed, or ratchet face, and a nut-locking cup or block having an elastic pawl or tongue, and a bolt-hole, the edge of which is provided with a lip or lug adapted to traverse the groove in the bolt and engage the diagonally or spirally channeled or furrowed portion, substantially as described.

2. The combination of a threaded bolt having a reduced end portion, grooved longitudinally and constructed with a plurality of channels or furrows trending diagonally or spirally in a direction the reverse of the direction in which the screw-thread of the bolt trends, with a nut having an annular, toothed, or ratchet face, and a nut-locking cup having an elastic pawl or tongue secured in the bottom thereof, and a bolt-hole, the edge of which is provided with a lip or lug adapted to traverse the groove in the bolt and enter one of the diagonal or spiral channels or furrows, substantially as described.

In testimony whereof I have hereunto set my hand in presence of two subscribing witnesses.

FRANK A. MERSHON.

Witnesses:
WM. V. HEAPHY,
THOS. B. C. YEARLEY.